(12) United States Patent  
Pan et al.

(10) Patent No.: US 8,724,356 B2  
(45) Date of Patent: May 13, 2014

(54) TWO-STAGE ISOLATED DC/AC CONVERSION CIRCUIT STRUCTURE

(75) Inventors: Ching-Tsai Pan, Hsinchu (TW); Po-Yen Chen, Hsinchu (TW); Ching-Hsiang Cheng, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 103 days.

(21) Appl. No.: 13/404,018

(22) Filed: Feb. 24, 2012

(65) Prior Publication Data

US 2013/0170266 A1  Jul. 4, 2013

(30) Foreign Application Priority Data

Dec. 30, 2011  (TW) .............................. 100149689 A

(51) Int. Cl.  
    *H02M 7/537* (2006.01)  
    *G05F 1/00* (2006.01)

(52) U.S. Cl.  
    USPC .......................................... 363/131; 323/266

(58) Field of Classification Search  
    USPC ............. 363/15–17, 24–26, 95–98, 131–134; 323/266  
    See application file for complete search history.

(56) References Cited

U.S. PATENT DOCUMENTS

| | | | |
|---|---|---|---|
| 6,115,267 A * | 9/2000 | Herbert | 363/25 |
| 6,297,972 B1 * | 10/2001 | Chen | 363/37 |
| 7,218,541 B2 * | 5/2007 | Price et al. | 363/134 |
| 7,480,162 B2 * | 1/2009 | Price et al. | 363/134 |
| 7,626,834 B2 * | 12/2009 | Chisenga et al. | 363/25 |
| 8,089,785 B2 * | 1/2012 | Rodriguez | 363/35 |
| 2010/0091526 A1 * | 4/2010 | Schlecht | 363/25 |
| 2012/0290145 A1 * | 11/2012 | Joshi et al. | 700/298 |

* cited by examiner

*Primary Examiner* — Timothy J Dole  
*Assistant Examiner* — Ivan Laboy Andino  
(74) *Attorney, Agent, or Firm* — Chun-Ming Shih

(57) ABSTRACT

A two-stage isolated DC/AC conversion circuit structure, consisting of a main switch, a second switch attached to a controller, another controller for controlling, and in work mode 1 and 2, after passing through the capacitor filter the low frequency half sine wave power is stored on this capacitor. After an inductor outputs the low frequency half sine wave power through this capacitor filter, it can respectively pass through the first and second transformers to increase the voltage, and then pass through the first and second secondary diode rectifiers, outputting the positive and negative half waves AC to the end user, and allow the end user to obtain the whole wave of the AC. Using the first and second diodes prevents outputting in reverse, and has the effect of isolation, and prevents all the stored energy for the later stage end user recharging to the front stage DC/AC conversion circuit.

7 Claims, 5 Drawing Sheets

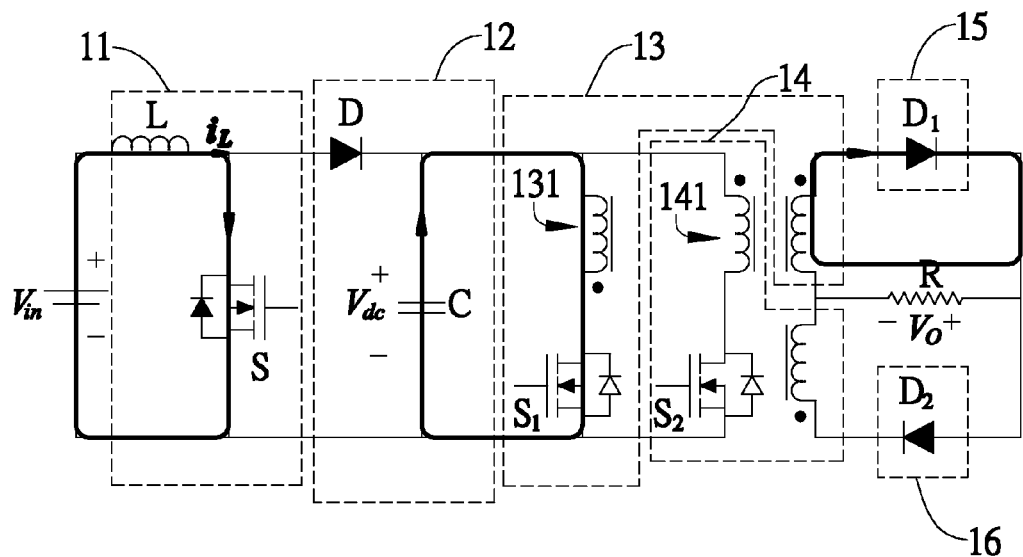
FIG. 5(Mode 1)
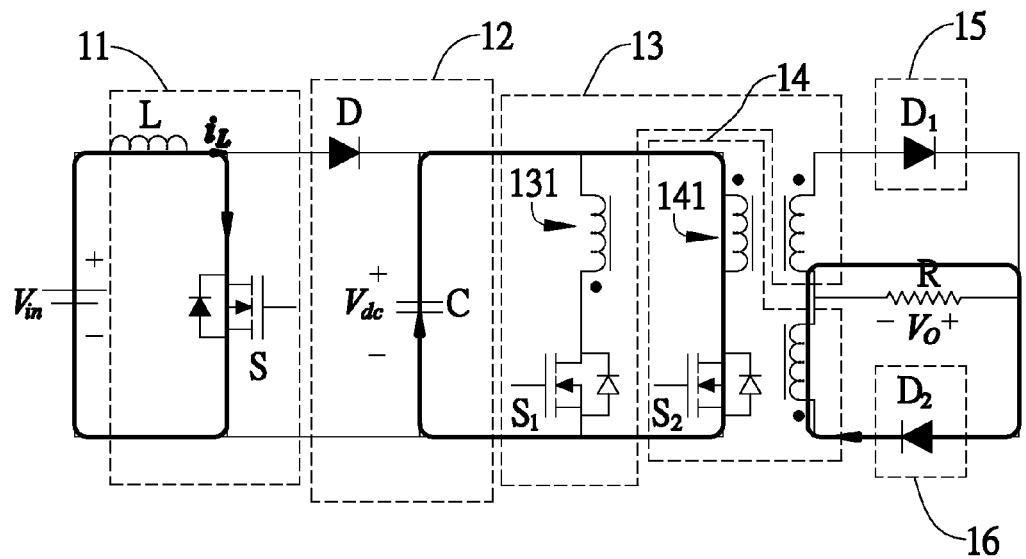
FIG. 6(Mode 1)

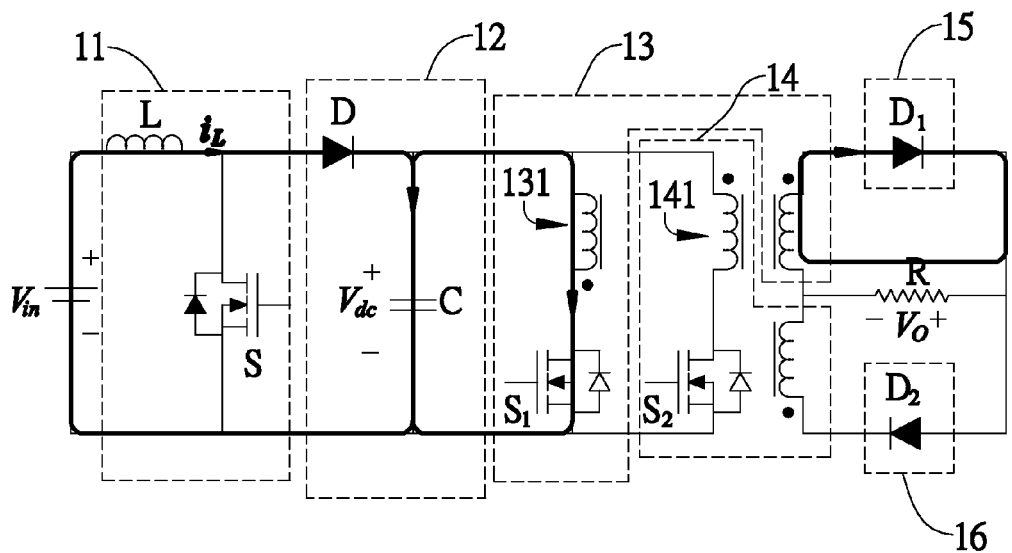
FIG. 7 (Mode 2)
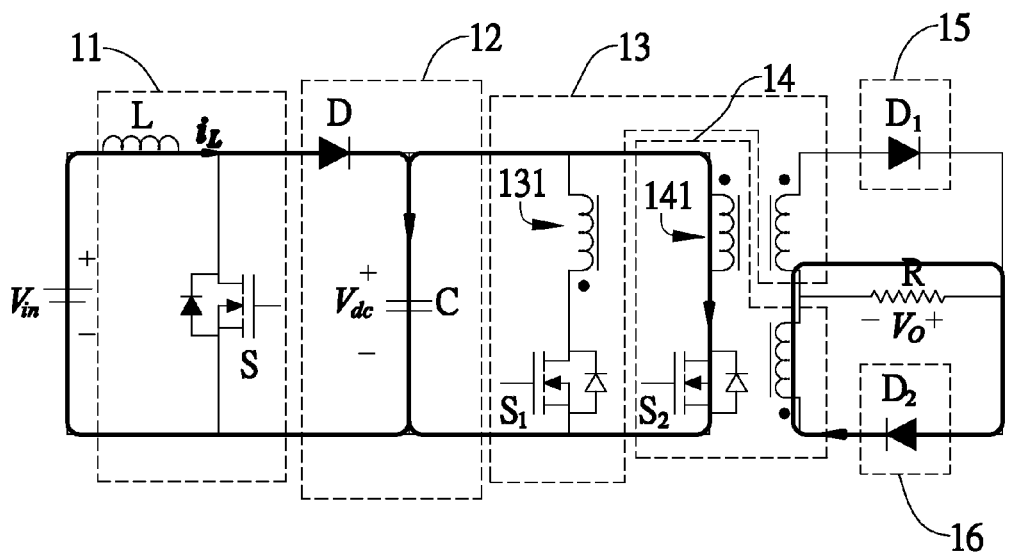
FIG. 8 (Mode 2)

TWO-STAGE ISOLATED DC/AC CONVERSION CIRCUIT STRUCTURE

BACKGROUND OF THE INVENTION

1. Field of the Invention

The present invention relates to a two-stage isolated DC/AC conversion circuit structure, in particular, to a circuit design able to reduce the capacity value of the DC link output capacitor, to use a capacitor with smaller capacitance and avoid using an electrolytic capacitor with large capacitance but a short lifespan, so as to increase the service life of the circuit, and the later stage AC converter able to operate in low-frequency switching, which not only reduces the switching losses and the impact of dead time, and improves circuit efficiency, but also reduces the circuit volume and cost, thereby increasing the converter's working life, and when the converter operates in a grid connected operation mode, it can be seamlessly controlled in grid connected operation mode through circuit design and control.

2. Description of Related Art

Conventional DC/AC converters, as in Taiwan patent application serial No. 092200019, (improved structure of a DC to AC converter) disclose the following: a switch circuit, this switch circuit is a bridge type switch circuit, with one end having a DC power supply, and the AC end is connected in series to the storage inductor, and again connected to a side end of the transformer input; one transformer, the other end of the input side again connected to the other AC end of the electric switch, and the second AC end of the switch circuit is situated respectively on the second diode; one integrated circuit, the input end connected to the second diode, and the output end then connected to the pulse width modulation controller on the feedback end ; one pulse width modulation controller, the reference electric potential end is connected to the waveform generator, to input the sine waves of the waveform generator; one waveform generator, to generate half cycle sine waves, and to generate low frequency square waves to supply the control driver circuit, one control driver circuit, to calculate the output of the pulse width modulation controller and the low frequency square waves generated by the waveform generator, and to provide the control signals required by the switch circuit.

In a conventional DC/AC converter, even though the DC electricity of the DC power supply only passes a group of switch circuits and one transformer, it can convert the electricity and output an AC, simplify the circuit structure, and can also improve its reliability and save costs. But this circuit structure is still complex, and the cost of the many used electrical components is high, and it doesn't possess isolation effects, and can't prevent all the stored energy for the later stage electricity end user recharging to the front stage DC/AC converter electric circuit, which results in damaged circuits. From this you will notice the above conventional device has many drawbacks, is not well designed, and is waiting for improvement.

Therefore looking at the flaws and drawbacks of the above described conventional DC/AC converter, this inventor was eager to improve on the innovation, and after many years of painstaking research has finally successfully researched and developed this kind of two-stage isolated DC/AC converter electric circuit structure.

SUMMARY OF THE INVENTION

One purpose of the present invention is to provide a two-stage isolated DC/AC conversion circuit structure, having the isolation effect to prevent the energy stored in for the later stage end user being recharged to the front stage DC/AC conversion circuit.

Another purpose of the present invention is to provide a two-stage isolated DC/AC conversion circuit structure, which can reduce the capacity value of the DC link output capacitor in a circuit design, and avoid using the electrolytic capacitor, and the later stage AC converter able to operate in low-frequency switching.

The two-stage isolated DC/AC conversion circuit structure for achieving the abovementioned purpose includes: a DC power supply, a waveform generation circuit, an energy storage circuit, a first switch circuit, a second switch circuit, a first isolation circuit, a second isolation circuit and an end user;

Wherein, the waveform generation circuit is connected in parallel with the DC power supply Vin, and having an inductor and a main switch, the main switch controlled by a controller, showing conduction (ON) and cut-off (OFF), and utilizing the cycle of conduction and cut-off to control the charge and discharge time of the DC power supply to the inductor, resulting in gradual increases and reductions in charge and discharge times, allowing for gradual increases and reductions in the electric potentials, and these electric potentials converting the DC wave output power from the DC power supply Vin into a rarefaction wave power with half-sine wave.

The energy storage circuit is connected in parallel with the waveform generation circuit, and has a diode for preventing inversion and a low capacity capacitor, the capacitor able to store energy for the rarefaction wave power and filter out the high-frequency waves of the rarefaction wave and remain low-frequency half-sine wave;

The first switch circuit is connected in parallel with the storage circuit, and has a first transformer and a first switch, the first switch connected with the primary side of the first transformer.

The second switch circuit is connected in parallel with the first switch circuit, and has a second transformer and a second switch, the second switch connected with the primary side of the second transformer.

The first isolation circuit has a first diode for preventing reversal output, which connects with a secondary side of the first transformer and connects in parallel with an end user.

The second isolation circuit has a second diode for preventing output inversion, which connects with a secondary side of the second transformer and connects in parallel with an end user.

when in operation, the main switch, the first switch and the second switch are controlled by the controller and another controller and presents operating mode 1: the main switch conducts, the first switch conducts, the second switch is cut off, the main switch conducts, the first switch is cut off and the second switch conducts, which allows the low frequency half sine wave power stored in the capacitor after filtering to respectively be boosted through the first transformer and the second transformer, and then to be rectified through the first diode and the second diode, and outputting positive and negative half-wave AC power to the end user, so that the end user obtains full-wave AC power.

Then, the main switch, the first switch and the second switch are controlled by the controller and another controller and presents operating mode 2: the main switch is cut off, the first switch conducts, the second switch is cut off, the main switch is cut off, the first switch is cut off and the second switch conducts, which allows the DC power supply Vin to be converted as a rarefaction wave power through the inductor for charging and discharging, forming low-frequency sine wave power after capacitor filtering, the low-frequency sine wave power is output to the capacitor for charging; after charging, the low-frequency sine wave power is rectified through the first diode and the second diode, outputting positive and negative half-wave AC power to the end user, so that the end user obtains full-wave AC power.

Therefore, the AC power converted from the DC power is obtained by the end user, which can reduce the capacity value of the DC link output capacitor in a circuit design, and avoid using the electrolytic capacitor, and the later stage AC converter is able to operate in low-frequency switching, and using the first and second diodes to prevent the characteristics of outputting in reverse, has the effect of isolation, and is able to prevent all the stored energy for the later stage end user recharging to the front stage DC/AC conversion circuit.

The invention, as well as its many advantages, may be further understood by the following detailed description and drawings in which:

DETAILED DESCRIPTION OF THE INVENTION

The present invention provides a "two-stage isolated DC/AC conversion circuit structure", mainly converting light energy into DC power by solar panels, wherein the DC power is boosted to enough high voltage and converted into AC power through DC/AC conversion and further output to the power companies for providing power to regular home users.

Please refer to FIG. 1, the two-stage isolated DC/AC conversion circuit structure mainly includes: a DC power supply Vin, a waveform generation circuit 11, an energy storage circuit 12, a first switch circuit 13, a second switch circuit 14, a first isolation circuit 15, a second isolation circuit 16 and an end user R.

Wherein, the waveform generation circuit 11 is connected in parallel with the DC power supply Vin, and having an inductor L and a main switch S, the main switch S controlled by a controller (not shown in the figure), showing conduction (ON) and cut-off (OFF), utilizing the cycle of conduction and cut-off to control the charge and discharge time of the DC power supply Vin to the inductor L, has the result of gradually increasing and reducing charging and discharging time, allowing for gradually increasing and reducing potentials, and the potentials converting the DC wave output power from the DC power supply Vin into a rarefaction wave power with half-sine wave. (as shown in FIG. 2).

The energy storage circuit 12 is connected in parallel with the waveform generation circuit 11, and having a low capacity capacitor C and a diode D for preventing inversion, the capacitor C is able to store energy for the rarefaction wave power 21 and filter out the high-frequency waves 211 of the rarefaction wave and the remaining low-frequency half-sine wave power 212 (as shown in FIG. 2).

The first switch circuit 13 is connected in parallel with the storage circuit 12, having a first transformer 131 and a first switch S1, the first switch S1 is connected with the primary side of the first transformer 131.

The second switch circuit 14 is connected in parallel with the first switch circuit 13, having a second transformer 141 and a second switch S2, the second switch S2 connected with the primary side of the second transformer 141.

The first isolation circuit 15 has a first diode D1 for preventing reversal output, which connects with a secondary side of the first transformer 131 and connects in parallel with an end user R.

The second isolation circuit 16 has a second diode D2 for preventing reversal output, which connects with a secondary side of the second transformer 141 and connects in parallel with an end user R.

When in operation, please refer to FIGS. 5-6-7 and 8, the main switch S, the first switch S1 and the second switch S2 are controlled by the controller and another controller (not shown in the figure) and presents operating mode 1: the main switch S conducts, the first switch S1 conducts, the second switch is cut off, the main switch S conducts, the first switch S1 is cut off, and the second switch S2 conducts, which allows the low frequency half sine wave power 212 to be stored in the capacitor C after filtering, and respectively to be boosted through the first transformer 131 and the second transformer 141, and then to be rectified through the first diode D1 and the second diode D2, outputting positive half-wave AC power 41 and negative half-wave AC power 42 to the end user R, so that the end user R obtains full-wave AC power 43 (as shown in FIG. 4A, 4B, 4C).

Then, the main switch S, the first switch Si and the second switch S2 are controlled by the controller and another controller and presents operating mode 2: the main switch S is cut off, the first switch S1 conducts, the second switch S2 is cut off, the main switch S is cut off, the first switch S1 is cut off, the second switch S2 conducts, which allows the DC power Vin to be converted as a rarefaction wave power 21 through the inductor L charging and discharging, forming low-frequency sine wave power 212 after the capacitor C filtering, the low-frequency sine wave power 212 output to the capacitor C for charging; after charging, the low-frequency sine wave power 212 is rectified through the first diode D1 and the second diode D2, outputting positive half-wave AC power 41 and negative half-wave AC power 42 to the end user R, so that the end user R obtains full-wave AC power 43 (as shown in FIG. 4A, 4B, 4C).

Thus, the operating mode 1 and 2 are repeated constantly, the end user R acquiring AC power converted from DC power supply Vin. Also, the capacity value of the DC link output capacitor can be reduced in a circuit design, thereby using a capacitor with smaller capacitance and avoiding using an electrolytic capacitor with a larger capacitance, but a shorter lifespan, so as to increase the service life of the circuit, and the AC converter able to operate in low-frequency switching, and using the properties of the first diode D1 and second diode D2 to prevent inversion output has the effect of isolation, and can prevent all the stored energy for the later stage electricity end user R recharging to the front stage DC/AC converter electric circuit.

Also, the DC power supply Vin is converted from light energy through a solar panel generator.

The controller is a waveform generator, which generates trigger waves to trigger the main switch S for presenting conduction (ON) and cut-off (OFF).

The other controller is a waveform generator, which can generate two inverted trigger waves 31 and 32 (as shown in FIG. 3) to trigger the first switch S1 to conduct, the second switch S2 to cut off and the first switch S1 to cut off, the second switch S2 to conduct.

The end user R is a power company for providing power to regular home users.

The end user R is a home user or an industrial power consumer

When comparing the two-stage isolated DC/AC conversion circuit structure of the present invention with the aforementioned conventional techniques, the present invention has the following advantages:

1. Possessing the effect of isolation and able to prevent all the stored energy for the later stage electricity end user recharging to the front stage DC/AC converter electric circuit.

2. Able to reduce the capacity value of the DC link output capacitor in a circuit design, and avoid using the electrolytic capacitor, and the AC converter able to operate in low-frequency switching.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

BRIEF DESCRIPTION OF THE DRAWINGS

The invention, as well as its many advantages, may be further understood by the following detailed description and drawings in which:

FIGS. 5 and 6 are the circuit schematic diagrams showing the operating mode 1 of the invention.

FIGS. 7 and 8 are the circuit schematic diagrams showing the operating mode 2 of the invention.

Figure 1:
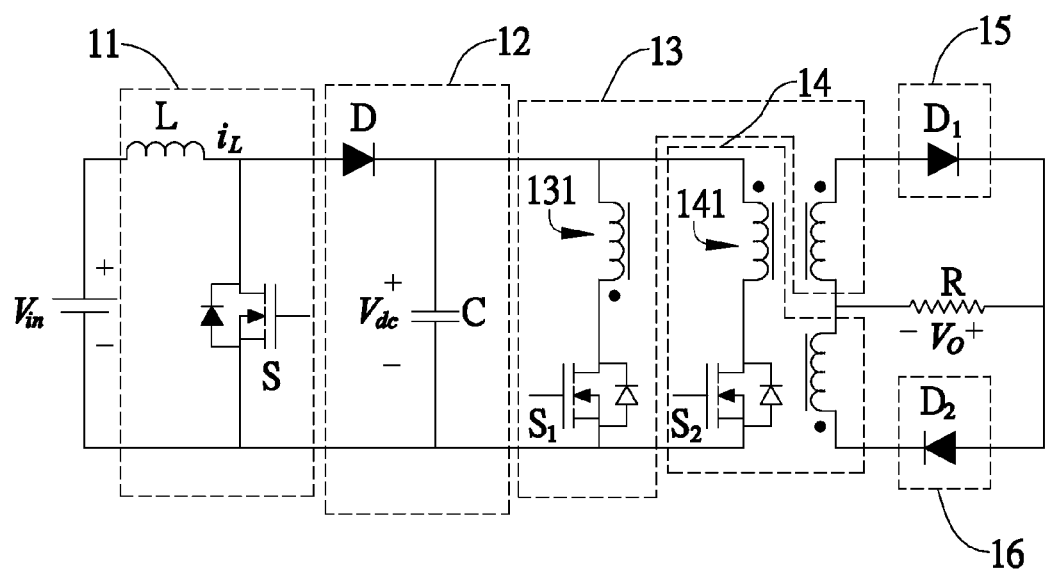
FIG. 1 is a circuit diagram of the invention.
Figure 2:
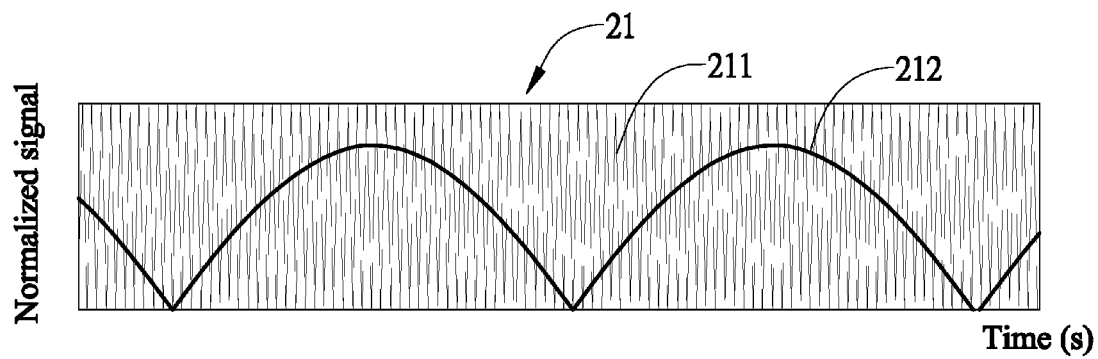
FIG. 2 is a diagram showing rarefaction wave power of the present invention.
Figure 3:
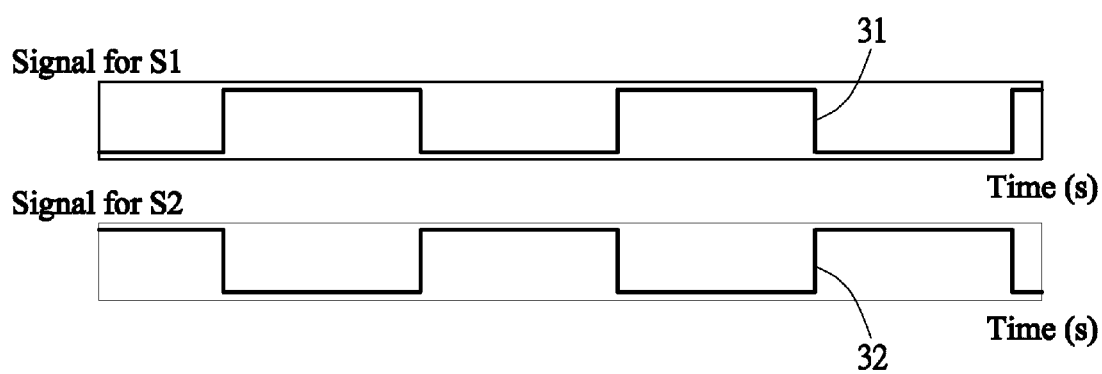
FIG. 3 is a diagram showing two reverse trigger waves of the present invention.
Figure 4A:
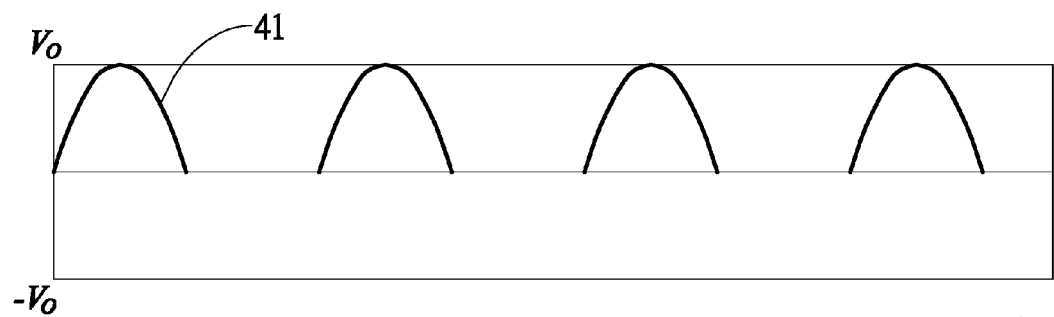
FIG. 4A is a diagram showing a half-wave AC of the present invention.
Figure 4B:
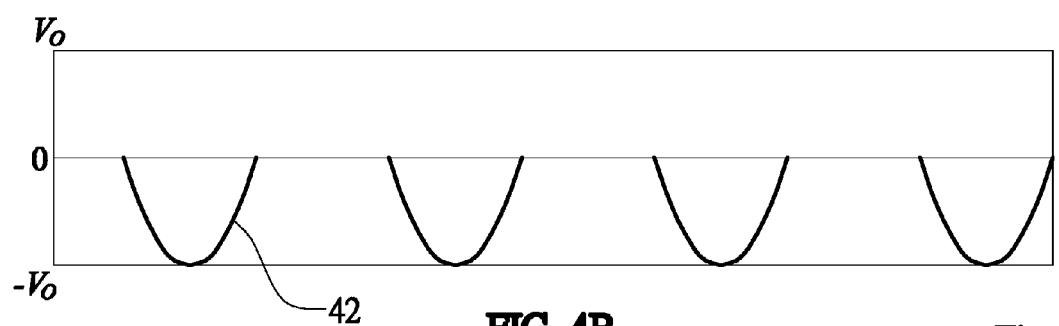
FIG. 4B is a diagram showing a negative half-wave AC of the present invention.
Figure 4C:
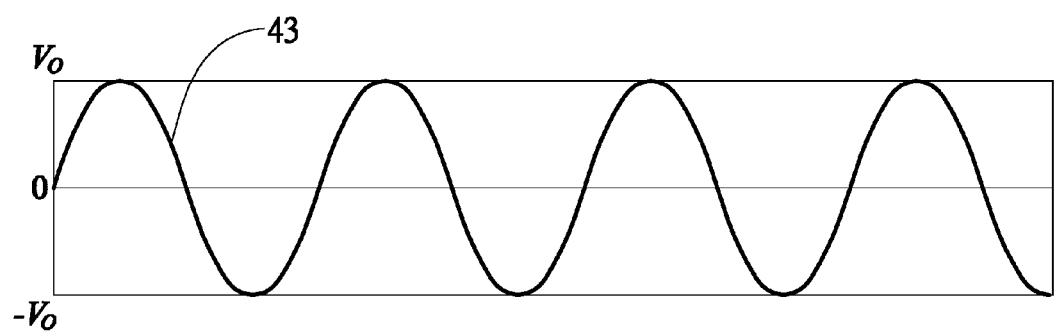
FIG. 4C is a diagram showing a full-wave AC of the present invention.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A two-stage isolated DC/AC conversion circuit structure, comprising:

a DC power supply;

a waveform generation circuit connected in parallel with the DC power supply, having an inductor and a main switch, the main switch controlled by a controller, showing conduction and cut-off, utilizing a cycle of conduction and cut-off to control a charge and discharge time of the DC power supply to the inductor, the result being to gradually increase and reduce the charge and discharge time, allowing for gradually increasing and reducing potentials, and the potentials converting the DC wave from the DC power supply into a rarefaction wave power with positive half wave;

an energy storage circuit connected in parallel with the waveform generation circuit, having a capacitor with low capacity and a diode for preventing inversion, the capacitor able to be converted into the rarefaction wave power for energy storage and filtering out high-frequency waves of the rarefaction wave and remaining positive half wave power with low-frequency;

a first switch circuit connected in parallel with the energy storage circuit, having a first transformer and a first switch, the first switch connected with a primary side of the first transformer;

a second switch circuit connected in parallel with the first switch circuit, having a second transformer and a second switch, the second switch connected with a primary side of the second transformer;

a first isolation circuit having a first diode for preventing output inversion, connected with a secondary side of the first transformer and connected in parallel with an end user;

a second isolation circuit having a second diode for preventing output inversion, connected with a secondary side of the second transformer and connected in parallel with the end user: allowing the first, second switches and the main switch to be controlled by the controller and another controller and showing operating mode 1: the main switch conducts, the first switch conducts, the second switch is cut off, and the main switch conducts, the first switch is cut off, the second switch conducts, which allows positive half wave power with low-frequency stored in the capacitor after filtering, respectively to be boosted through the first and second transformers, and then to be rectified through the first and second diodes, outputting positive and negative half-wave AC power to the end user, so that the end user obtains full-wave AC power, then, the first, second and the main switches controlled by the controller and another controller and presenting operating mode 2: the main switch is cut off, the first switch conducts, the second switch is cut off, and the main switch is cut off, the first switch is cut off, the second switch conducts, which allows the DC power supply to be converted as a rarefaction wave power through the inductor charging and discharging, forming low-frequency sine wave power after the capacitor filtering, then the low-frequency sine wave power recharges the capacitor, after recharging, the low frequency half sine wave power is respectively boosted through the first and second transformers, and then is rectified through the first and second diodes, outputting positive and negative half-wave AC power to the end user, so that the end user obtains full-wave AC power, likewise, the operating mode 1 and 2 are repeated constantly, and the end user promptly acquires AC power converted from DC power supply.

2. The two-stage isolated DC/AC conversion circuit structure of claim 1, wherein the DC power supply is a solar panel power generator.

3. The two-stage isolated DC/AC conversion circuit structure of claim 1, wherein the controller is a waveform generator able to generate trigger wave for triggering the main switch to conduct and be cut off.

4. The two-stage isolated DC/AC conversion circuit structure of claim 1, wherein the another controller is a waveform generator able to generate two inverted trigger waves for triggering the first switch to conduct, the second switch to cut off and the first switch to cut off, and the second switch to conduct.

5. The two-stage isolated DC/AC conversion circuit structure of claim 1, wherein the end user is a power company.

6. The two-stage isolated DC/AC conversion circuit structure of claim 1, wherein the end user is a home user.

7. The two-stage isolated DC/AC conversion circuit structure of claim 1, wherein the end user is an industrial power consumer.

* * * * *